United States Patent
Craik et al.

(10) Patent No.: US 10,621,086 B2
(45) Date of Patent: Apr. 14, 2020

(54) DYNAMIC RESOURCE VISIBILITY TRACKING TO AVOID ATOMIC REFERENCE COUNTING

(71) Applicant: International Business Machines Corporation, Armonk, NY (US)

(72) Inventors: Andrew Craik, North York (CA); Younes Manton, Toronto (CA); Vijay Sundaresan, North York (CA); Yi Zhang, Markham (CA)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 15/797,141

(22) Filed: Oct. 30, 2017

(65) Prior Publication Data
US 2019/0129846 A1  May 2, 2019

(51) Int. Cl.
*G06F 12/02* (2006.01)

(52) U.S. Cl.
CPC ...... *G06F 12/0269* (2013.01); *G06F 12/0261* (2013.01); *G06F 2212/702* (2013.01)

(58) Field of Classification Search
CPC ............ G06F 12/0269; G06F 12/0261; G06F 2212/702
See application file for complete search history.

(56) References Cited

U.S. PATENT DOCUMENTS

| | | | | |
|---|---|---|---|---|
| 6,052,763 | A * | 4/2000 | Maruyama | G06F 13/1652 711/1 |
| 6,473,773 | B1 * | 10/2002 | Cheng | G06F 12/0253 707/814 |
| 6,993,770 | B1 * | 1/2006 | Detlefs | G06F 9/526 707/999.103 |
| 7,797,503 | B2 * | 9/2010 | Bellofatto | G06F 9/3004 711/163 |
| 8,539,454 | B2 * | 9/2013 | Havin | G06F 11/3466 717/130 |
| 2002/0004886 | A1 * | 1/2002 | Hagersten | G06F 11/0712 711/141 |
| 2002/0087590 | A1 * | 7/2002 | Bacon | G06F 12/0261 |
| 2002/0166030 | A1 * | 11/2002 | McKenney | G06F 11/3466 711/141 |
| 2004/0205313 | A1 * | 10/2004 | Hudson | G06F 9/526 711/163 |

(Continued)

FOREIGN PATENT DOCUMENTS

WO   WO2016148670 A1   9/2016

*Primary Examiner* — Ramon A. Mercado
(74) *Attorney, Agent, or Firm* — Yee & Associates, P.C.

(57) ABSTRACT

Determining whether to perform atomic or conventional reference counting is provided. A single bit of a reference count corresponding to a reference-counted resource is read to determine whether to atomic reference counting is to be performed. It is determined whether the single bit of the reference count is set. In response to determining that the single bit is set, an atomic operation for atomic maintenance of the reference count corresponding to the reference-counted resource is performed by adjusting the reference count by a value of two. In response to determining that the single bit is not set, a conventional adjustment operation is performed for maintenance of the reference count corresponding to the reference-counted resource.

20 Claims, 6 Drawing Sheets

(56) References Cited

U.S. PATENT DOCUMENTS

| | | | |
|---|---|---|---|
| 2006/0037026 A1* | 2/2006 | Doherty | G06F 12/0261 |
| | | | 719/310 |
| 2007/0226431 A1* | 9/2007 | McKenney | G06F 9/3851 |
| | | | 711/154 |
| 2010/0030968 A1* | 2/2010 | Pasch | G06F 12/0261 |
| | | | 711/125 |
| 2013/0014120 A1* | 1/2013 | Ross | G06F 9/526 |
| | | | 718/104 |
| 2013/0166855 A1* | 6/2013 | Batwara | G06F 3/0608 |
| | | | 711/154 |
| 2014/0337459 A1* | 11/2014 | Kuang | H04L 67/2842 |
| | | | 709/213 |
| 2014/0372705 A1* | 12/2014 | Goodman | G06F 12/0891 |
| | | | 711/135 |
| 2015/0046655 A1* | 2/2015 | Nystad | G06F 12/0815 |
| | | | 711/125 |
| 2016/0117114 A1* | 4/2016 | Heller, Jr. | G06F 3/0608 |
| | | | 711/166 |
| 2016/0292072 A1 | 10/2016 | Edwards et al. | |
| 2016/0335180 A1* | 11/2016 | Teodorescu | G06F 16/9024 |
| 2018/0239597 A1* | 8/2018 | Kawachiya | G06F 8/443 |
| 2019/0129846 A1* | 5/2019 | Craik | G06F 12/0269 |

* cited by examiner

DYNAMIC RESOURCE VISIBILITY TRACKING TO AVOID ATOMIC REFERENCE COUNTING

BACKGROUND

1. Field

The disclosure relates generally to reference counting of reference-counted resources and more specifically to dynamic reference-counted resource visibility tracking to avoid atomic reference counting by determining whether to perform atomic increment/decrement or conventional increment/decrement to maintain a reference count based on whether or not the reference-counted resource is visible to more than one thread of a multi-threaded program.

2. Description of the Related Art

Reference counting is an automatic memory management scheme employed in software development and programming language design. Reference counting relieves a user from having to manage the allocation and deallocation of a unit (e.g., block or segment) of memory by maintaining an accurate count of all references (i.e., reference count) to that unit of memory at any given moment, and automatically deallocating that unit of memory once the reference count reaches zero, which indicates that the unit of memory is no longer needed. Each new reference to the unit of memory causes the reference count to be incremented. Similarly, once that reference to the unit of memory is severed, the reference count is decremented.

SUMMARY

According to one illustrative embodiment, a computer-implemented method for determining whether to perform atomic or conventional reference counting is provided. A computer reads a single bit of a reference count corresponding to a reference-counted resource to determine whether atomic reference counting is to be performed. The computer determines whether the single bit of the reference count is set. In response to the computer determining that the single bit is set, the computer performs an atomic operation for atomic maintenance of the reference count corresponding to the reference-counted resource by adjusting the reference count by a value of two. In response to the computer determining that the single bit is not set, the computer performs a conventional adjustment operation for maintenance of the reference count corresponding to the reference-counted resource. According to other illustrative embodiments, a computer system and computer program product for determining whether to perform atomic or conventional reference counting are provided.

DETAILED DESCRIPTION

Figure 1:
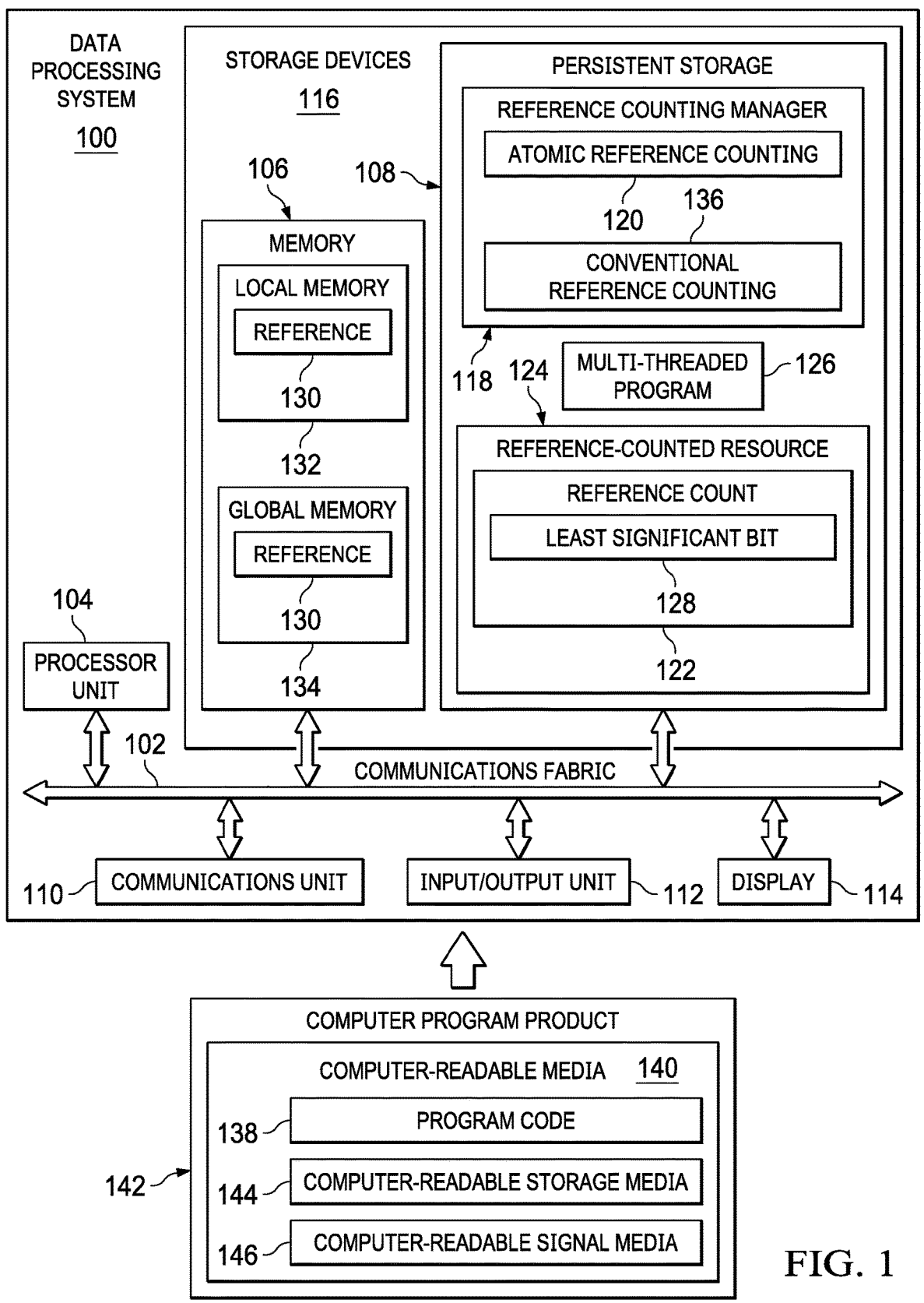
FIG. 1 is a diagram of a data processing system in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIG. 1, a diagram of data processing environment is provided in which illustrative embodiments may be implemented. It should be appreciated that FIG. 1 is only meant as an example and is not intended to assert or imply any limitation with regard to the environments in which different embodiments may be implemented. Many modifications to the depicted environment may be made.

FIG. 1 depicts a diagram of a data processing system in accordance with an illustrative embodiment. Data processing system 100 is an example of a computer in which computer readable program code or program instructions implementing processes of illustrative embodiments may be located. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software applications and programs that may be loaded into memory 106. In this example, processor unit 104 may represent a set of two or more hardware processor devices or may represent one processor device with two or more processor cores, depending on the particular implementation. Further, different illustrative embodiments may implement processor unit 104 using multiple heterogeneous processors or using multiple processors of the same type.

Memory 106 and persistent storage 108 are examples of storage devices 116. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 106, in these examples, may be, for example, a random-access memory, or any other suitable volatile or non-volatile storage device. Persistent storage 108 may take various forms, depending on the particular implementation. For example, persistent storage 108 may contain one or more devices. For example, persistent storage 108 may be a hard drive, a flash memory, a rewritable optical disk, a rewritable magnetic tape, or some combination of the above. The media used by persistent storage 108 may be removable. For example, a removable hard drive may be used for persistent storage 108.

In this example, persistent storage 108 stores reference counting manager 118. Reference counting manager 118 controls the process of tracking reference-counted resource visibility to avoid atomic reference counting 120 by determining whether to perform atomic increment/decrement or conventional increment/decrement of reference count 122 based on whether reference-counted resource 124 is or ever has been visible to more than one thread of multi-threaded program 126. Reference-counted resource 124 may be, for example, a unit, segment, block, or portion of memory 106, an object in memory 106, or a space, such as a disk space, in persistent storage 108. It should be noted that reference-counted resource 124 may represent a plurality of different reference counted resources in data processing system 100. Multi-threaded program 126 may represent any type of multi-threaded program that data processing system 100 can execute using processor unit 104. Further, multiple threads of multi-threaded program 126 may run concurrently.

Reference counting manager 118 performs atomic reference counting 120 for reference-counted resource 124 when least significant bit 128 is set in reference count 122. Reference count 122 represents the number of references corresponding to reference-counted resource 124 by one or more threads in multi-threaded program 126. Least significant bit 128 is the least significant bit of reference count 122. Reference counting manager 118 utilizes least significant bit 128 of reference count 122 to indicate whether reference 130 has only been stored in local memory 132 or whether reference 130 has ever been stored to a globally visible portion (i.e., global memory 134) of memory 106. Reference 130 represents a reference by a thread in multi-threaded program 126 to reference-counted resource 124. However, it should be noted that reference 130 may represent a plurality of different references corresponding to one or more reference-counted resources.

If reference 130 has ever been stored in global memory 134, then reference 130 is visible to multiple threads in multi-threaded program 126 (i.e., reference-counted resource 124 is allocated to two or more threads for use). In addition, because reference 130 is stored in global memory 134, reference counting manager 118 sets least significant bit 128 of reference count 122 corresponding to reference-counted resource 124. Also, it should be noted that once reference counting manager 118 sets least significant bit 128 of reference count 122, least significant bit 128 remains set (i.e., least significant bit 128 is never unset after being set).

Setting least significant bit 128 of reference count 122 indicates that reference-counted resource 124 is visible to multiple threads in multi-threaded program 126. As a result, reference counting manager 118 utilizes atomic reference counting 120 to increment and decrement reference count 122 corresponding to reference-counted resource 124. When reference counting manager 118 utilizes atomic reference counting 120, all increments and decrements of reference count 122 are a single, indivisible operation seen by each of the multiple threads.

If reference 130 is stored in local memory 132, then reference 130 is only visible to one thread in multi-threaded program 126 (i.e., reference-counted resource 124 is exclusively allocated to one thread for use). In addition, because reference 130 is stored in local memory 132, reference counting manager 118 does not set least significant bit 128 of reference count 122 corresponding to reference-counted resource 124 to avoid using atomic reference counting 120. As a result, reference counting manager 118 utilizes conventional reference counting 136 to increment or decrement reference count 122 corresponding to reference-counted resource 124. When reference counting manager 118 utilizes conventional reference counting 136, each increment or decrement of reference count 122 is a basic arithmetic operation of either addition or subtraction seen by the one thread.

Reference counting manager 118 may be implemented in, for example, a compiler. A compiler is a software application that transforms high-level source code to low-level machine code to create an executable program. The compiler may perform many operations, such as, for example, preprocessing, lexical analysis, parsing, semantic analysis, conversion of source input to a target output, program code optimization, and program code generation.

However, it should be noted that even though reference counting manager 118 is illustrated as residing in persistent storage 108, in an alternative illustrative embodiment reference counting manager 118 may be a separate component of data processing system 100. For example, reference counting manager 118 may be a hardware component coupled to communication fabric 102. Alternatively, reference counting manager 118 may be a combination of hardware and software components.

Communications unit 110, in this example, provides for communication with other computers, data processing systems, and devices via a network. Communications unit 110 may provide communications using both physical and wireless communications links. The physical communications link may utilize, for example, a wire, cable, universal serial bus, or any other physical technology to establish a physical communications link for data processing system 100. The wireless communications link may utilize, for example, shortwave, high frequency, ultra-high frequency, microwave, wireless fidelity (WiFi), Bluetooth® technology, near field communication, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 100.

Input/output unit 112 allows for the input and output of data with other devices that may be connected to data processing system 100. For example, input/output unit 112 may provide a connection for user input through a keyboard, keypad, mouse, and/or some other suitable input device. Display 114 provides a mechanism to display information to a user and may include touch screen capabilities to allow the user to make on-screen selections through user interfaces or input data, for example.

Instructions for the operating system, applications, and/or programs may be located in storage devices 116, which are in communication with processor unit 104 through communications fabric 102. In this illustrative example, the instructions are in a functional form on persistent storage 108. These instructions may be loaded into memory 106 for running by processor unit 104. The processes of the different embodiments may be performed by processor unit 104 using computer-implemented program instructions, which may be located in a memory, such as memory 106. These program instructions are referred to as program code, computer usable program code, or computer readable program code that may be read and run by a processor in processor unit 104. The program code, in the different embodiments, may be embodied on different physical computer readable storage devices, such as memory 106 or persistent storage 108.

Program code 138 is located in a functional form on computer readable media 140 that is selectively removable and may be loaded onto or transferred to data processing system 100 for running by processor unit 104. Program code 138 and computer readable media 140 form computer program product 142. In one example, computer readable media 140 may be computer readable storage media 144 or computer readable signal media 146. Computer readable storage media 144 may include, for example, an optical or magnetic disc that is inserted or placed into a drive or other device that is part of persistent storage 108 for transfer onto a storage device, such as a hard drive, that is part of persistent storage 108. Computer readable storage media 144 also may take the form of a persistent storage, such as a hard drive, a thumb drive, or a flash memory that is connected to data processing system 100. In some instances, computer readable storage media 144 may not be removable from data processing system 100.

Alternatively, program code 138 may be transferred to data processing system 100 using computer readable signal media 146. Computer readable signal media 146 may be, for example, a propagated data signal containing program code 138. For example, computer readable signal media 146 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 138 may be downloaded over a network to persistent storage 108 from another device or data processing system through computer readable signal media 146 for use within data processing system 100. For instance, program code stored in a computer readable storage media in a data processing system may be downloaded over a network from the data processing system to data processing system 100. The data processing system providing program code 138 may be a server computer, a client computer, or some other device capable of storing and transmitting program code 138.

The different components illustrated for data processing system 100 are not meant to provide architectural limitations to the manner in which different embodiments may be implemented. The different illustrative embodiments may be implemented in a data processing system including components in addition to, or in place of, those illustrated for data processing system 100. Other components shown in FIG. 1 can be varied from the illustrative examples shown. The different embodiments may be implemented using any hardware device or system capable of executing program code. As one example, data processing system 100 may include organic components integrated with inorganic components and/or may be comprised entirely of organic components excluding a human being. For example, a storage device may be comprised of an organic semiconductor.

As another example, a computer readable storage device in data processing system 100 is any hardware apparatus that may store data. Memory 106, persistent storage 108, and computer readable storage media 144 are examples of physical storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Traditionally, maintaining the reference count of a reference-counted resource has been relatively cheap in terms of computing resources, since reference counting involves the most basic arithmetic operations of addition and subtraction. However, high-performance computing environments frequently employ multiple processors and multi-threaded software such that reference count maintenance is potentially much more expensive in terms of computing resources. For example, if a reference-counted resource can be referenced by multiple software threads and if those software threads can run concurrently on a multi-processor computing device, then the reference counting scheme must maintain the reference count atomically such that all increments and decrements are seen as a single, indivisible operation by all of the software threads. On most processor architectures, atomic increment and decrement operations are far more expensive than conventional increments and decrements such that the overall cost of reference counting is increased when reference counts are maintained atomically.

Illustrative embodiments utilize a reference counting scheme that foregoes atomic increments and decrements in favor of conventional increments and decrements when possible in a multi-threaded environment. In order to forego the atomic reference count maintenance, illustrative embodiments determine whether or not a reference-counted resource is visible to more than one thread. As long as a reference-counted resource is only visible to a single thread, illustrative embodiments maintain the reference count without having to use atomic increment and decrement operations. Consequently, illustrative embodiments reduce the computing resource overhead of reference counting and, thus, improve overall computing device performance. Illustrative embodiments place the burden of identifying when a reference-counted resource becomes visible to multiple threads on a reference counting manager, such as, for example, a compiler.

In a typical programming environment, a program's working memory is usually divided into two categories, local memory and global memory. Local memory is allotted to one thread in a multi-threaded program for the thread's exclusive use. Global memory is shared by all threads. Consequently, in order to determine whether or not a particular reference-counted resource is visible to more than one thread (i.e., multiple threads), illustrative embodiments track whether references to that particular reference-counted resource are ever stored in global memory. For example, references to a reference-counted resource stored in local memory is only visible to one thread and is not visible to other threads of the multi-threaded program. Conversely, references to a reference-counted resource stored in global memory is visible to two or more threads, although not all of the threads may actually access the referenced resource.

For each reference-counted resource, illustrative embodiments assign a single bit of storage that indicates whether a reference to a particular reference-counted resource has ever been stored in global memory or not. The bit, itself, is part of the reference count for a reference-counted resource such that the least significant bit (LSB) of the reference count indicates whether or not the reference to the reference-counted resource was ever stored in global memory. This bit is "sticky" such that once the bit is set, the bit always remains set. The reason for the bit being sticky is that once a reference to a reference-counted resource has been stored to global memory, illustrative embodiments are not able to make any further guarantees. In other words, the reference counting scheme of illustrative embodiments does not attempt to track all globally-stored references to reference-counted resources in order to identify which reference-counted resources were once globally-stored, but have since been locally-stored, under the assumption that the cost of such tracking would outweigh any benefit. Because illustrative embodiments utilize the least significant bit of the reference count, illustrative embodiments increment and decrement the reference count of a reference-counted resource by two to avoid disturbing the least significant bit of the reference count. Thus, checking whether a reference count has reached zero requires that illustrative embodiments ignore the least significant bit. In other words, illustrative embodiments take a reference count of zero or one to be equivalent to a count of zero.

Upon initial allocation of a reference-counted resource, illustrative embodiments unset the least significant bit in the reference count because a reference to a reference-counted resource cannot be globally-stored prior to the reference being made visible by some subsequent action. Every time illustrative embodiments store the reference to memory, illustrative embodiments distinguish between storage of the reference to local memory and storage of the reference to global memory. For example, if illustrative embodiments store the reference in global memory (i.e., memory that is not local), illustrative embodiments set the least significant bit of the reference count. However, it should be noted that depending on the programming language semantics and the computing environment, illustrative embodiments may not be able to determine whether a reference is being stored in local memory or global memory. In such cases, illustrative embodiments assume that the reference is being stored in global memory and visible to multiple threads. In a typical programming language, when the reference is stored to a local variable, passed as a parameter, or stored to a local static, the reference will not be made visible to any other threads. Conversely, when the reference is stored to a global variable, the reference is potentially visible to multiple threads and illustrative embodiments set the least significant bit in the reference count. In the context of a compiler, this determination is made at compile-time of a multi-threaded program as the storage location and scope of most variables in the program are already known and a fundamental part of the compilation process.

Whenever reference count maintenance is required, illustrative embodiments first read the least significant bit of the reference count to determine whether atomic reference count maintenance is required. If atomic reference count maintenance is required, then illustrative embodiments perform atomic increment or decrement of the reference count as required. If atomic reference count maintenance is not required, then illustrative embodiments perform conventional increment or decrement of the reference count as required. At first glance, this sequence appears to be susceptible to a race condition in that illustrative embodiments read and test the least significant bit of the reference count prior to maintaining the reference count, which involves multiple non-atomic operations and allows for the least significant bit to be set by another thread between the time illustrative embodiments read the least significant bit and test the least significant bit to determine what sort of maintenance is required. However, illustrative embodiments avoid this situation by virtue of the fact that if the least significant bit is not currently set, the least significant bit can only be set by the current thread since the reference is not globally visible by other threads. Conversely, once the least significant bit of the reference count is set, the least significant bit cannot be unset. As a result, the inverse situation is not a concern. However, it should be noted that the inverse situation would cause illustrative embodiments to perform atomic reference count maintenance without being required to do so, which is a performance concern, but does not affect correctness of the program.

In the context of a compiler, the reference counting scheme of illustrative embodiments may be summarized as follows:

For a variable expression x=y in a program, where variable x and variable y are references to reference-counted resources or are null variables:

```
// First, maintain the refcount of the resource currently referred to by x:
// If x refers to a resource, and the resource is globally visible, decrement it's
// refcount atomically, otherwise decrement its refcount conventionally.
// If the refcount is less than 2, deallocate the resource currently referred to by x.
if x != null
if LSB(refcount(x)) == 1
atomicDecrement(refcount(x), 2)
else
decrement(refcount(x), 2)
if refcount(x) < 2
deallocate(x)
// Next, maintain the refcount of the resource currently referred to by y:
// If y refers to a resource, and the resource is globally visible, increment it's
// refcount atomically, otherwise increment its refcount conventionally.
// This sequence is sufficient when the variable x is known to be locally stored.
if y != null
if LSB(refcount(y)) == 1
atomicIncrement(refcount(y), 2)
else
increment(refcount(y), 2)
// If the variable x is not known to be locally stored, set the LSB after conventionally
// incrementing the refcount. Don't set the LSB when the refcount
// is atomically incremented, since it implies that the LSB is already set.
// The above code sequence can then be re-stated as follows:
if y != null
if LSB(refcount(y)) == 1
atomicIncrement(refcount(y), 2)
else
increment(refcount(y), 2)
LSB(refcount(y)) = 1
// Finally, copy the reference from y to x:
 x = y
```

When determining whether the variable x is known to be stored locally or not, illustrative embodiments consider the "types" of variables made available in the programming language. Typically, these variable types can be categorized as follows: global variable (i.e., stored in global memory); static variable (i.e., not a global variable, but stored in global memory and visible to multiple threads); auto variable (i.e., stored in local memory); parameter (i.e., stored in local memory); and temporary variable (i.e., stored in local memory). In addition, many programming languages embody the concept of a pointer, which is a variable that refers to another variable either in language semantics or in language implementation. When considering pointers, where the pointer, itself, is stored is irrelevant. What is important is where the variable that is "pointed-to" by the pointer is stored. Compiler analyses that determine what a pointer points to are well-known. However, if what a pointer points to cannot be determined, illustrative embodiments assume that the pointer points to a variable in global memory.

Figure 2:
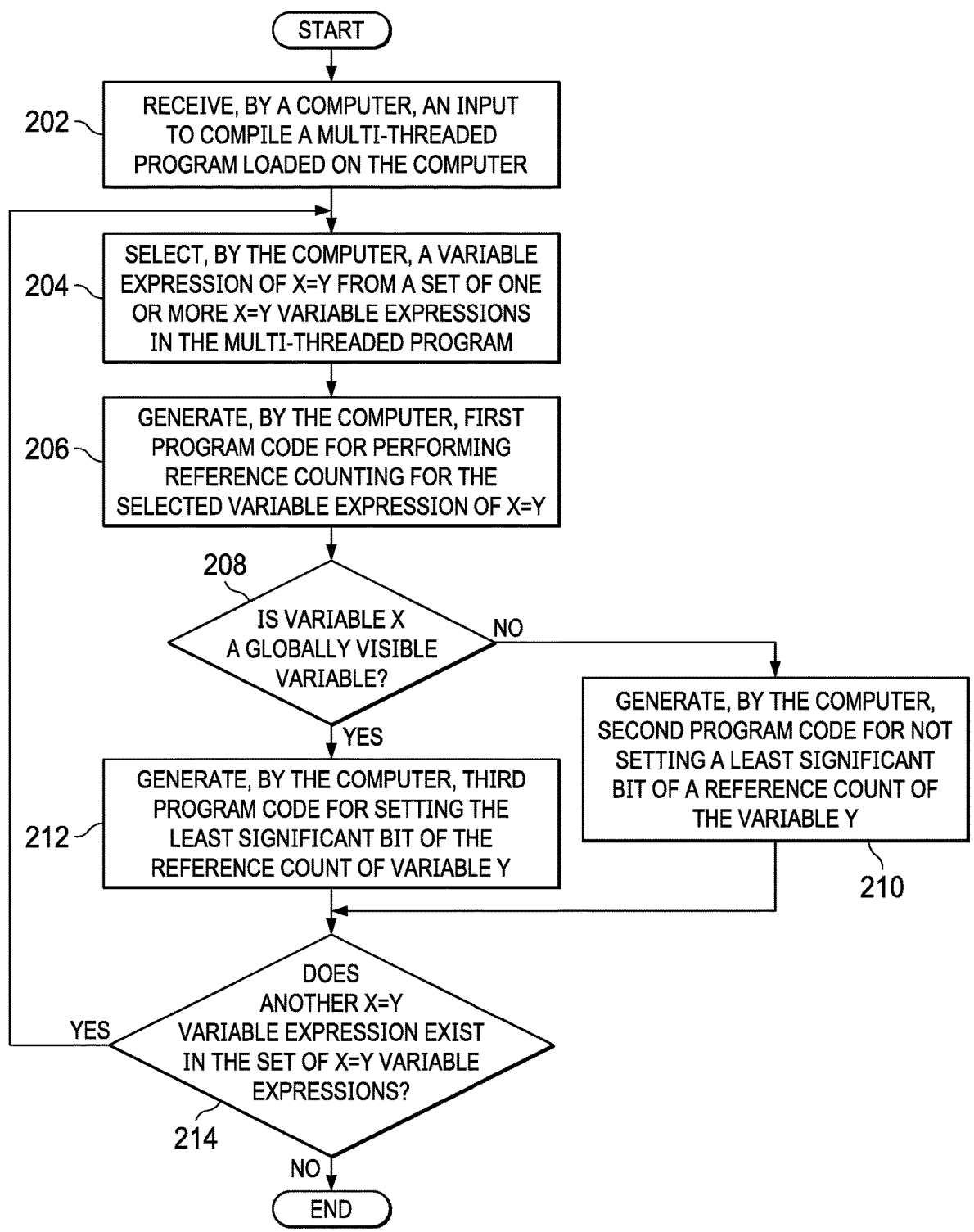
FIG. 2 is a flowchart illustrating a process for compiling a multi-threaded program in accordance with an illustrative embodiment.

With reference now to FIG. 2, a flowchart illustrating a process for compiling a multi-threaded program is shown in accordance with an illustrative embodiment. The process shown in FIG. 2 may be implemented in a computer, such as, for example, data processing system 100 in FIG. 1.

The process begins when the computer receives an input to compile a multi-threaded program, such as multi-threaded program 126 in FIG. 1, which is loaded on the computer (step 202). The computer selects a variable expression of x=y from a set of one or more x=y variable expressions in the multi-threaded program (step 204). Then, the computer generates first program code for performing reference counting for the selected variable expression of x=y (step 206).

Afterward, the computer makes a determination as to whether the variable x is a globally visible variable (step 208). If the computer determines that the variable x is a locally visible variable, no output of step 208, then the computer generates second program code for not setting a least significant bit of a reference count of the variable y (step 210). Thereafter, the process proceeds to step 214.

If the computer determines that the variable x is a globally visible variable, yes output of step 208, then the computer generates third program code for setting the least significant bit of the reference count of the variable y (step 212). Afterward, the computer makes a determination as to whether another x=y variable expression exists in the set of x=y variable expressions (step 214). If the computer determines that another x=y variable expression does exist in the set of x=y variable expressions, yes output of step 214, then the process returns to step 204 where the computer selects another x=y variable expression. If the computer determines that another x=y variable expression does not exist in the set of x=y variable expressions, no output of step 214, then the process terminates thereafter.

Figure 3A:
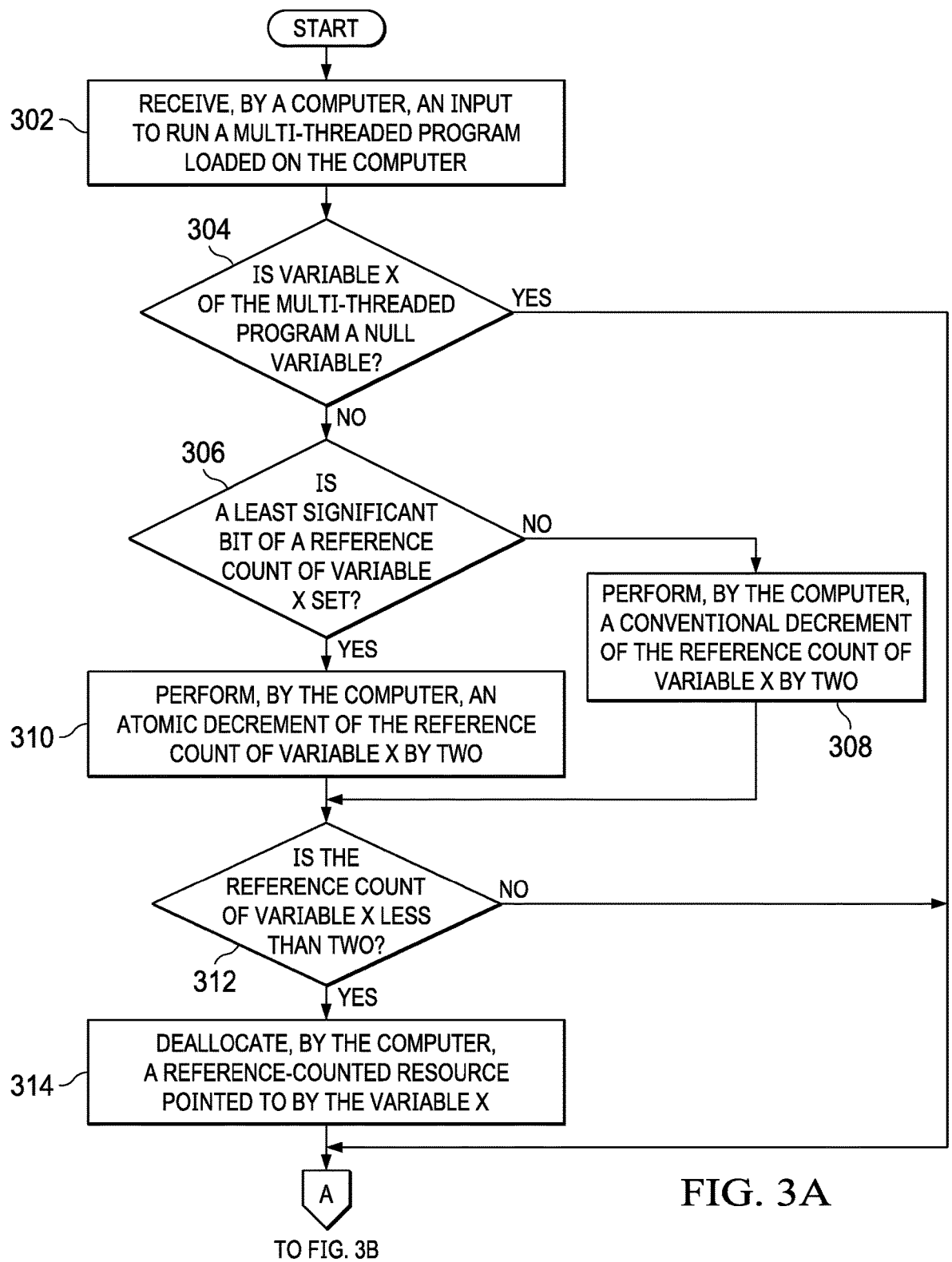
FIGS. 3A-3B are a flowchart illustrating a process for running a multi-threaded program in accordance with an illustrative embodiment.
Figure 3B:
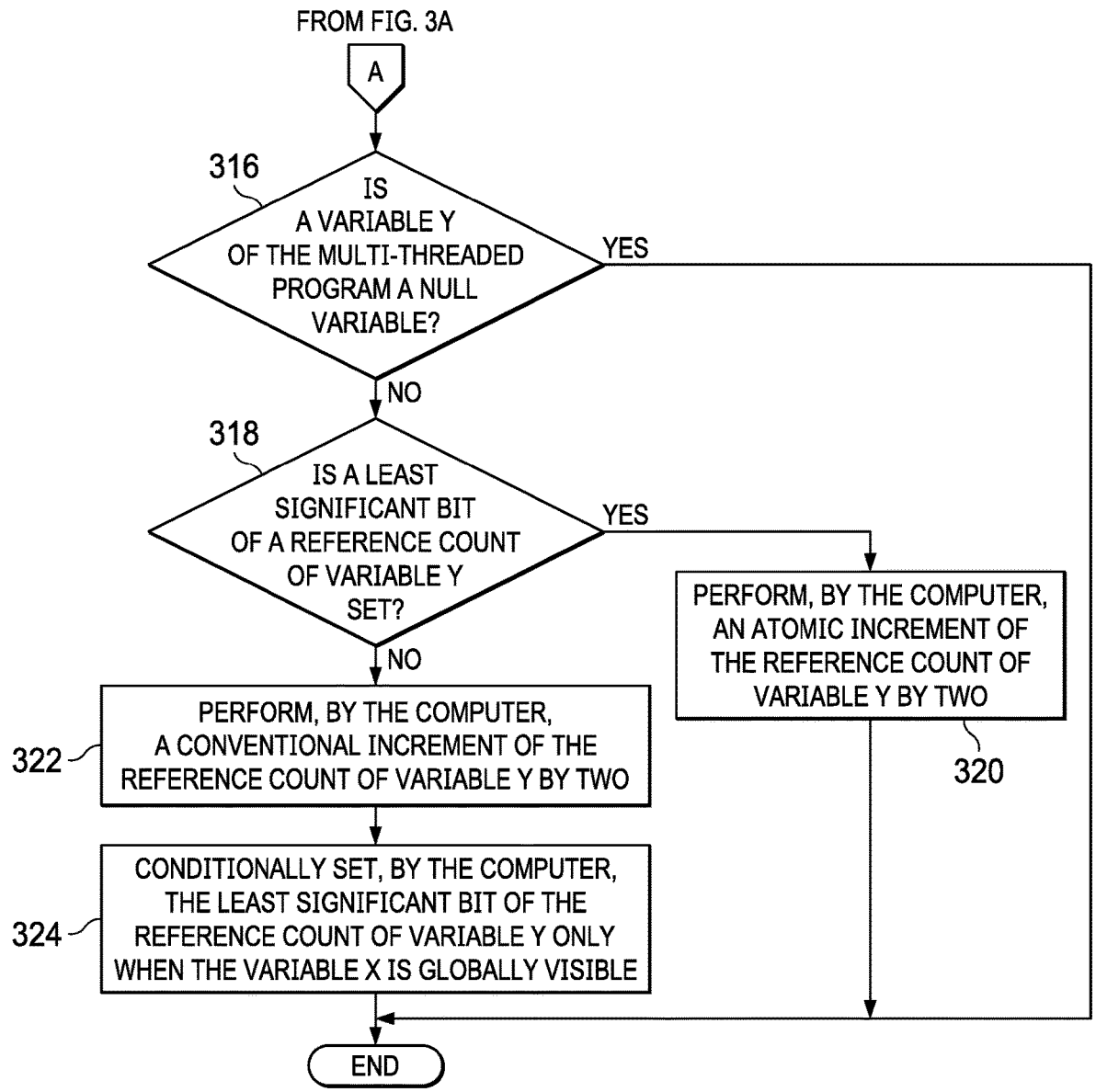

With reference now to FIGS. 3A-3B, a flowchart illustrating a process for running a multi-threaded program is shown in accordance with an illustrative embodiment. The process shown in FIGS. 3A-3B may be implemented in a computer, such as, for example, data processing system 100 in FIG. 1.

The process begins when the computer receives an input to run a multi-threaded program, such as multi-threaded program 126 in FIG. 1, which is loaded on the computer (step 302). Then, the computer makes a determination as to whether a variable x of the multi-threaded program is a null variable (step 304). A null variable means that variable x does not point to a reference-counted resource, such as reference-counted resource 124 in FIG. 1. If the computer determines that the variable x is a null variable (i.e., does not point to a reference-counted resource), yes output of step 304, then the process proceeds to step 316. If the computer determines that the variable x is not a null variable (i.e., does point to a reference-counted resource), no output of step 304, then the computer makes a determination as to whether a least significant bit of a reference count of the variable x is set (step 306).

If the computer determines that the least significant bit of the reference count of the variable x is not set (i.e., the variable x is locally visible to only one thread of the multi-threaded program), no output of step 306, then the computer performs a conventional decrement of the reference count of the variable x by two (step 308). Thereafter, the process proceeds to step 312. If the computer determines that the least significant bit of the reference count of the variable x is set (i.e., the variable x is globally visible to multiple threads of the multi-threaded program), yes output of step 306, then the computer performs an atomic decrement of the reference count of the variable x by two (step 310).

Afterward, the computer makes a determination as to whether the reference count of the variable x is less than two (step 312). If the computer determines that the reference count of the variable x is less than two, yes out step 312, then the computer deallocates the reference-counted resource referred to by the variable x (step 314). Thereafter, the process proceeds to step 316. If the computer determines that the reference count of the variable x is greater than or equal to two, no out step 312, then the computer makes a determination as to whether a variable y of the multi-threaded program is a null variable (step 316). It should be noted that the variable y may point to the same reference-counted resource as the variable x or may point to a different reference-counted resource.

If the computer determines that the variable y is a null variable (i.e., does not point to a reference-counted resource), yes output of step 316, then the process terminates thereafter. If the computer determines that the variable y is not a null variable (i.e., does point to a reference-counted resource), no output of step 316, then the computer makes a determination as to whether a least significant bit of a reference count of the variable y is set (step 318). If the computer determines that the least significant bit of the reference count of the variable y is set, yes output of step 318, then the computer performs an atomic increment of the reference count of the variable y by two (step 320). Thereafter, the process terminates.

If the computer determines that the least significant bit of the reference count of the variable y is not set, no output of step 318, then the computer performs a conventional increment of the reference count of the variable y by two (step 322). In addition, the computer may conditionally set the least significant bit of the reference count of the variable y only when the variable x is globally visible (step 324). In other words, if the variable x is globally visible, then the computer (e.g., the compiler) inserts step 324. Conversely, if the variable x is locally visible, then the computer does not insert step 324. Thereafter, the process terminates.

Figure 4A:
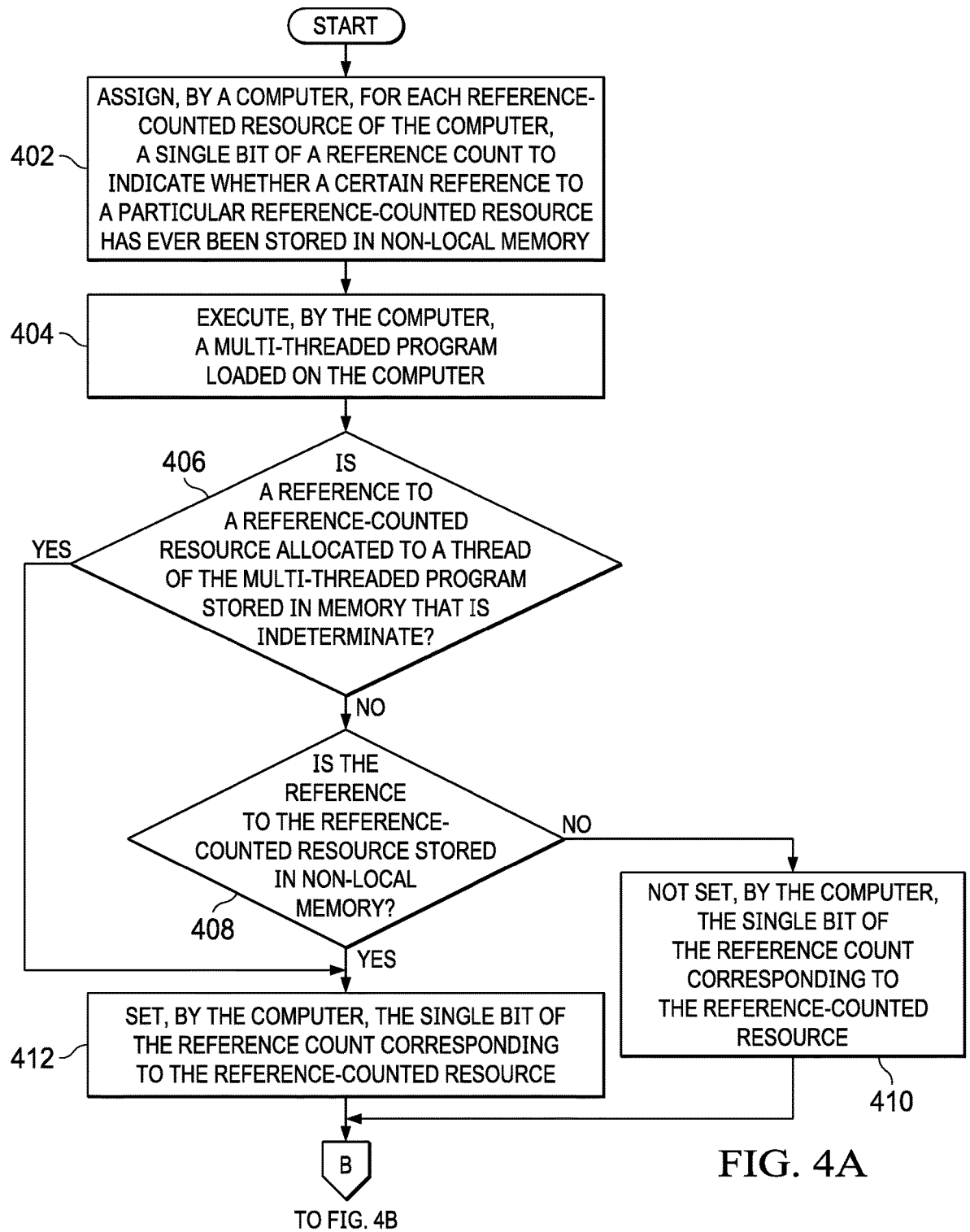
FIGS. 4A-4B are a flowchart illustrating a process for determining whether to set a bit of a reference count corresponding to a reference-counted resource that determines whether atomic or conventional reference counting is performed in accordance with an illustrative embodiment.
Figure 4B:
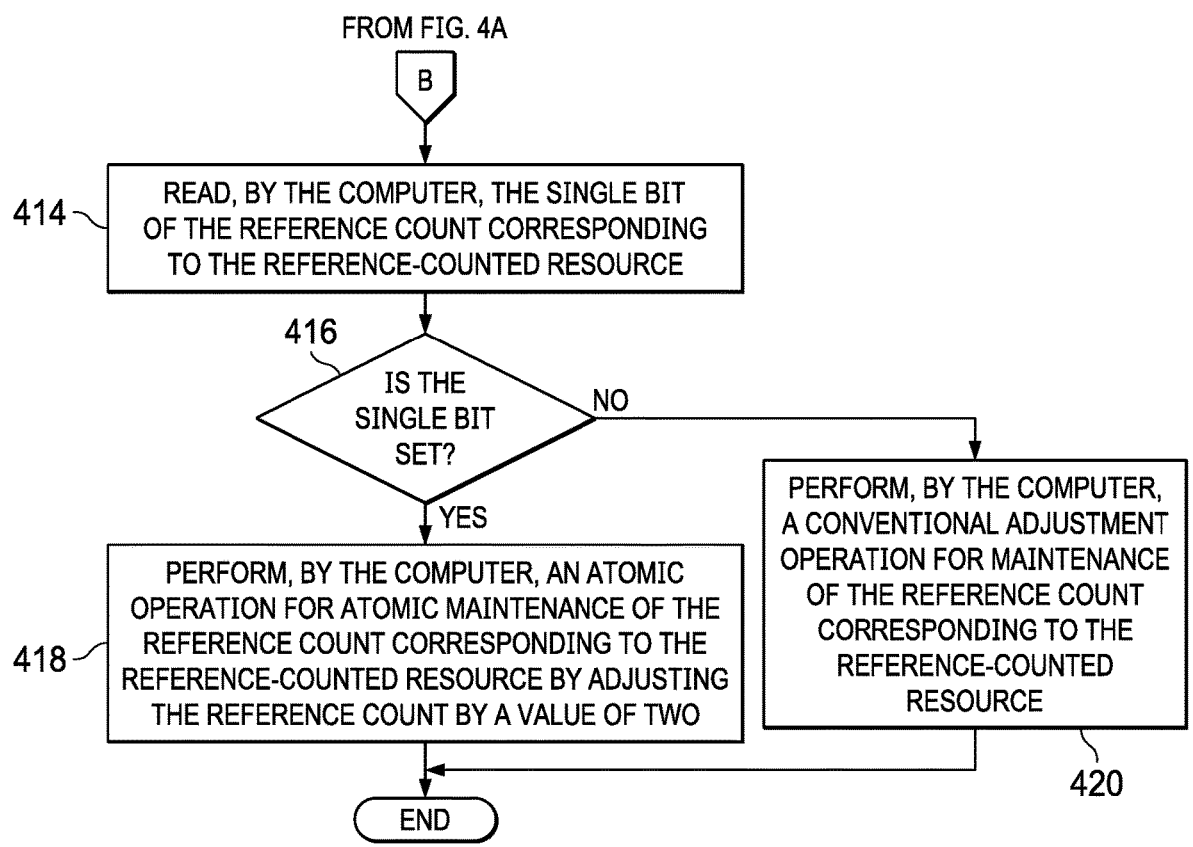

With reference now to FIGS. 4A-4B, a flowchart illustrating a process for determining whether to set a bit of a reference count corresponding to a reference-counted resource that determines whether atomic or conventional reference counting is performed is shown in accordance with an illustrative embodiment. The process shown in FIGS. 4A-4B may be implemented in a computer, such as, for example, data processing system 100 in FIG. 1.

The process begins when the computer assigns, for each reference-counted resource of the computer, a single bit of a reference count to indicate whether a certain reference to a particular reference-counted resource has ever been stored in non-local/global memory (step 402). It should be noted that the computer unsets the single bit upon initial allocation of the reference-counted resource. Afterward, once the computer sets the single bit, the single bit remains set for a lifetime of the reference-counted resource.

Subsequently, the computer executes a multi-threaded program, such as multi-threaded program 126 in FIG. 1, which is loaded on the computer (step 404). In addition, the computer makes a determination as to whether a reference to a reference-counted resource allocated to a thread of the multi-threaded program is stored in memory that is indeterminate (step 406). In other words, the computer is not able to determine whether the memory is local or global memory. The reference to the reference-counted resource may be, for example, reference 130 to reference-counted resource 124 in FIG. 1.

If the computer determines that the reference to the reference-counted resource allocated to a thread of the multi-threaded program is stored in memory that is indeterminate, yes output of step 406, then the process proceeds to step 412. If the computer determines that the reference to the reference-counted resource allocated to a thread of the multi-threaded program is stored in memory that is determinate, no output of step 406, then the computer makes a determination as to whether the reference to the reference-counted resource is stored in non-local/global memory (step 408). It should be noted that references stored in local memory are exclusively visible to one thread of the multi-threaded program and not visible to other threads of the program, while references stored in the non-local/global memory are visible to multiple threads of the program.

If the computer determines that the reference to the reference-counted resource is stored in local memory, no output of step 408, then the computer does not set the single bit of the reference count corresponding to the reference-counted resource (step 410). Thereafter, the process proceeds to step 414. If the computer determines that the reference to the reference-counted resource is stored in non-local/global memory, yes output of step 408, then the computer sets the single bit of the reference count corresponding to the reference-counted resource (step 412).

Subsequently, the computer reads the single bit of the reference count corresponding to the reference-counted resource (step 414). Further, the computer makes a determination as to whether the single bit is set (step 416). If the computer determines that the single bit is set, yes output of step 416, then the computer performs an atomic operation for atomic maintenance of the reference count corresponding to the reference-counted resource by adjusting the reference count by a value of two (step 418). Thereafter, the process terminates. If the computer determines that the single bit is not set, no output of step 416, then the computer performs a conventional adjustment operation for maintenance of the reference count corresponding to the reference-counted resource (step 420). Thereafter, the process terminates.

Thus, illustrative embodiments of the present invention provide a computer-implemented method, computer system, and computer program product for tracking reference-counted resource (e.g., memory segment) visibility to avoid atomic reference counting by determining whether to perform atomic increment/decrement or conventional increment/decrement of a reference count based on whether or not the reference-counted resource is visible to more than one thread of a multi-threaded program. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   a computer determining whether the computer performs atomic or conventional reference counting by the computer:
      reading a single bit of a reference count corresponding to a reference-counted resource to determine whether atomic reference counting is to be performed, wherein the single bit is a least significant bit of the reference count;
      determining whether the single bit of the reference count is set;
      responsive to determining that the single bit is set, performing an atomic operation for atomic maintenance of the reference count corresponding to the reference-counted resource by adjusting the reference count by a value of two;
      responsive to determining that the single bit is not set, performing a conventional adjustment operation for maintenance of the reference count corresponding to the reference-counted resource;
      determining whether a reference to the reference-counted resource is stored in a non-local memory, wherein references stored in a local memory are visible to one thread and not visible to other threads of a multi-threaded program, and wherein references stored in the non-local memory are visible to multiple threads of the multi-threaded program;
      responsive to determining that the reference to the reference-counted resource is stored in the non-local memory, setting the single bit of the reference count corresponding to the reference-counted resource; and
      responsive to determining that the reference to the reference-counted resource is stored to the local memory, not setting the single bit of the reference count corresponding to the reference-counted resource.

2. The computer-implemented method of claim 1, further comprising the computer:
   determining whether the reference to the reference-counted resource is stored in a memory that is indeterminate.

3. The computer-implemented method of claim 2, further comprising the computer:
   responsive to determining that the reference to the reference-counted resource is stored in a memory that is indeterminate, setting the single bit of the reference count corresponding to the reference-counted resource.

4. The computer-implemented method of claim 1 further comprising the computer:
   assigning for each reference-counted resource of the computer, a particular bit within reference counts to indicate whether a respective reference to a corresponding reference-counted resource has ever been stored to non-local memory.

5. The computer-implemented method of claim 1 further comprising the computer:
   receiving an input to run a multi-threaded program loaded on the computer;
   determining whether a first variable of the multi-threaded program is a null variable, wherein a null variable does not point to any reference-counted resource of the computer;
   responsive to determining that the first variable is a null variable, determining whether a second variable of the multi-threaded program is a null variable;
   responsive to determining that the first variable is not a null variable, determining whether a particular bit of a reference count of the first variable is set;
   responsive to determining that the particular bit of the reference count of the first variable is not set, performing a conventional decrement of the reference count of the first variable by two; and
   responsive to determining that the particular bit of the reference count of the first variable is set, performing an atomic decrement of the reference count of the first variable by two.

6. The computer-implemented method of claim 5 further comprising the computer:
   determining whether the reference count of the first variable is less than two; and
   responsive to determining that the reference count of the first variable is less than two, deallocating a particular reference-counted resource referred to by the first variable.

7. The computer-implemented method of claim 5 further comprising the computer:
responsive to determining that the second variable is not a null variable, determining whether a particular bit of a reference count of the second variable is set; and
responsive to determining that the particular bit of the reference count of the second variable is set, performing an atomic increment of the reference count of the second variable by two.

8. The computer-implemented method of claim 7 further comprising the computer:
responsive to determining that the particular bit of the reference count of the second variable is not set, performing a conventional increment of the reference count of the second variable by two; and
conditionally setting the particular bit of the reference count of the second variable only when the first variable is globally visible.

9. The computer-implemented method of claim 1 further comprising the computer:
receiving an input to compile a multi-threaded program loaded on the computer;
selecting a variable expression from a set of variable expressions in the multi-threaded program, wherein the variable expression includes a first variable and a second variable, and wherein the first variable is equal to the second variable; and
generating first program code to perform reference counting for the variable expression.

10. The computer-implemented method of claim 9 further comprising the computer:
determining whether the first variable in the variable expression is a globally visible variable;
responsive to determining that the first variable is a locally visible variable, generating second program code for not setting a particular bit of a reference count of the second variable; and
responsive to determining that the first variable is a globally visible variable, generating third program code for setting the particular bit of the reference count of the second variable.

11. The computer-implemented method of claim 1, further comprising the computer:
responsive to initial allocation of the reference-counted resource, unsetting the single bit, wherein the single bit remains set for the reference-counted resource after setting the single bit.

12. The computer-implemented method of claim 1, wherein the least significant bit of the reference count corresponds to the reference-counted resource.

13. The computer-implemented method of claim 1, wherein the reference-counted resource is one of a group that comprises a unit of memory, an object in memory, and a disk space.

14. A computer system for determining whether to perform atomic or conventional reference counting, the computer system comprising:
a bus system;
a storage device connected to the bus system, wherein the storage device stores program instructions; and
a processor connected to the bus system, wherein the processor executes the program instructions to:
read a single bit of a reference count corresponding to a reference-counted resource to determine whether atomic reference counting is to be performed;
determine whether the single bit of the reference count is set;
perform an atomic operation for atomic maintenance of the reference count corresponding to the reference-counted resource by adjusting the reference count by a value of two in response to determining that the single bit is set;
perform a conventional adjustment operation for maintenance of the reference count corresponding to the reference-counted resource in response to determining that the single bit is not set; and
determine whether a reference to the reference-counted resource is stored in a non-local memory, wherein references stored in a local memory are visible to one thread and not visible to other threads of a multi-threaded program, and wherein references stored in the non-local memory are visible to multiple threads of the multi-threaded program.

15. The computer system of claim 14, wherein the processor further executes the program instructions to:
set the single bit of the reference count corresponding to the reference-counted resource in response to determining that the reference to the reference-counted resource is stored in the non-local memory; and
not set the single bit of the reference count corresponding to the reference-counted resource in response to determining that the reference to the reference-counted resource is stored to the local memory.

16. The computer system of claim 14, wherein the processor further executes the program instructions to:
determine whether the reference to the reference-counted resource is stored in a memory that is indeterminate; and
set the single bit of the reference count corresponding to the reference-counted resource in response to determining that the reference to the reference-counted resource is stored in a memory that is indeterminate.

17. A computer program product comprising:
a non-transitory, computer-readable storage medium including instructions for a hardware processor determining whether the hardware processor performs atomic or conventional reference counting, the instructions comprising:
reading a single bit of a reference count corresponding to a reference-counted resource to determine whether atomic reference counting is to be performed;
determining whether the single bit of the reference count is set;
responsive to determining that the single bit is set, performing an atomic operation for atomic maintenance of the reference count corresponding to the reference-counted resource by adjusting the reference count by a value of two;
responsive to determining that the single bit is not set, performing a conventional adjustment operation for maintenance of the reference count corresponding to the reference-counted resource;
determining whether the reference to the reference-counted resource is stored in a memory that is indeterminate; and
assigning for each reference-counted resource, a particular bit within reference counts to indicate whether a respective reference to a corresponding reference-counted resource has ever been stored to non-local memory.

18. The computer program product of claim 17, wherein the instructions further comprise:

determining whether a reference to the reference-counted resource is stored in a non-local memory, wherein references stored in a local memory are visible to one thread and not visible to other threads of a multi-threaded program, and wherein references stored in the non-local memory are visible to multiple threads of the multi-threaded program.

19. The computer program product of claim 17, wherein the instructions further comprise:
responsive to determining that the reference to the reference-counted resource is stored in a memory that is indeterminate, setting the single bit of the reference count corresponding to the reference-counted resource.

20. The computer program product of claim 18, wherein the instructions further comprise:
responsive to determining that the reference to the reference-counted resource is stored in the non-local memory, setting the single bit of the reference count corresponding to the reference-counted resource; and
responsive to determining that the reference to the reference-counted resource is stored to the local memory, not setting the single bit of the reference count corresponding to the reference-counted resource.

* * * * *